Aug. 15, 1967  M. W. MARTIN, JR  3,335,457
BLOW MOLDING MACHINE WITH CONTINUOUSLY ROTATING
RECIPROCATING EXTRUDER SCREW
Filed Oct. 19, 1964  9 Sheets-Sheet 1

INVENTOR
MERRITT W. MARTIN, JR.
BY Olsen and Stephenson
ATTORNEYS

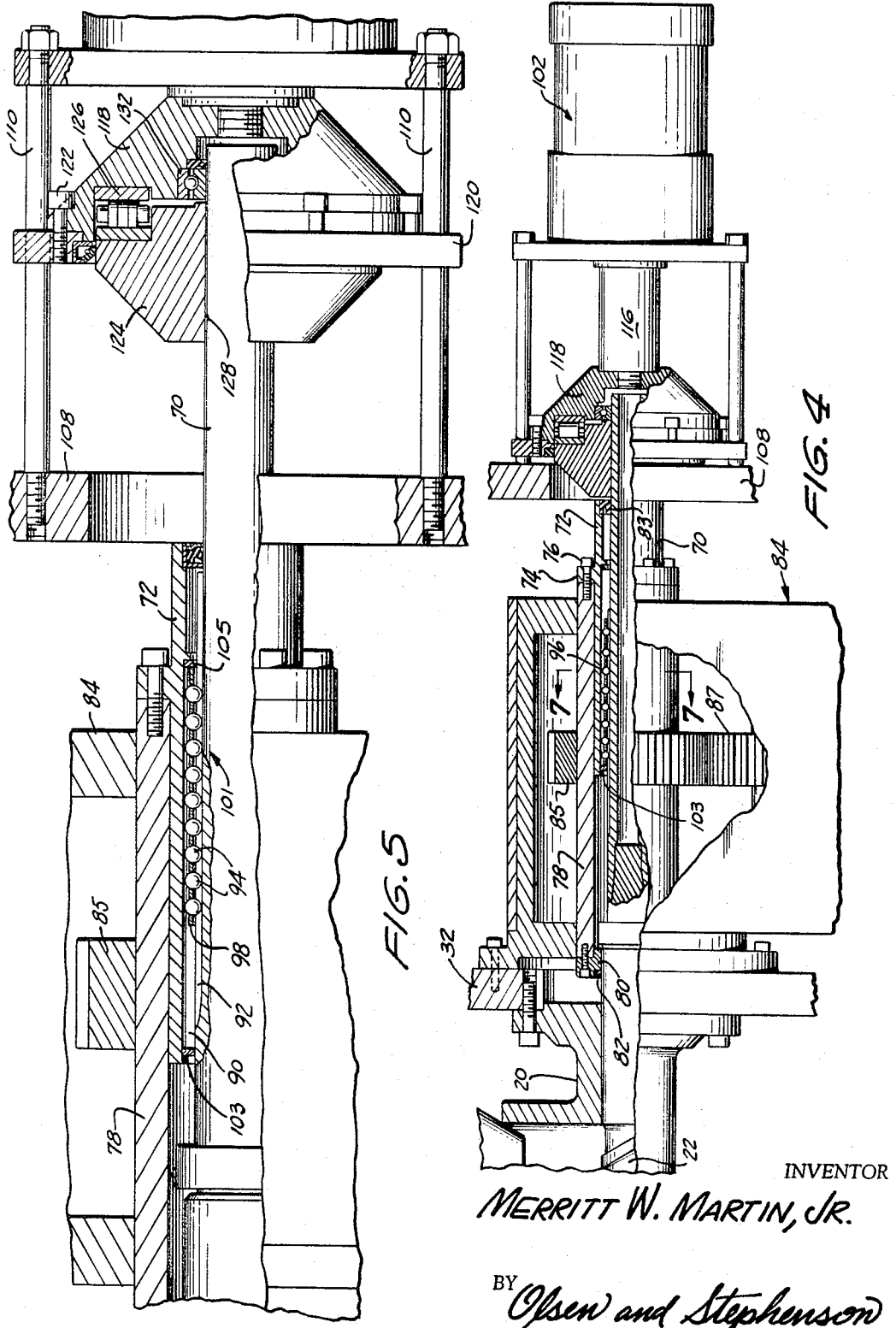

Aug. 15, 1967　　　M. W. MARTIN, JR　　　3,335,457
BLOW MOLDING MACHINE WITH CONTINUOUSLY ROTATING
RECIPROCATING EXTRUDER SCREW
Filed Oct. 19, 1964　　　9 Sheets-Sheet 4
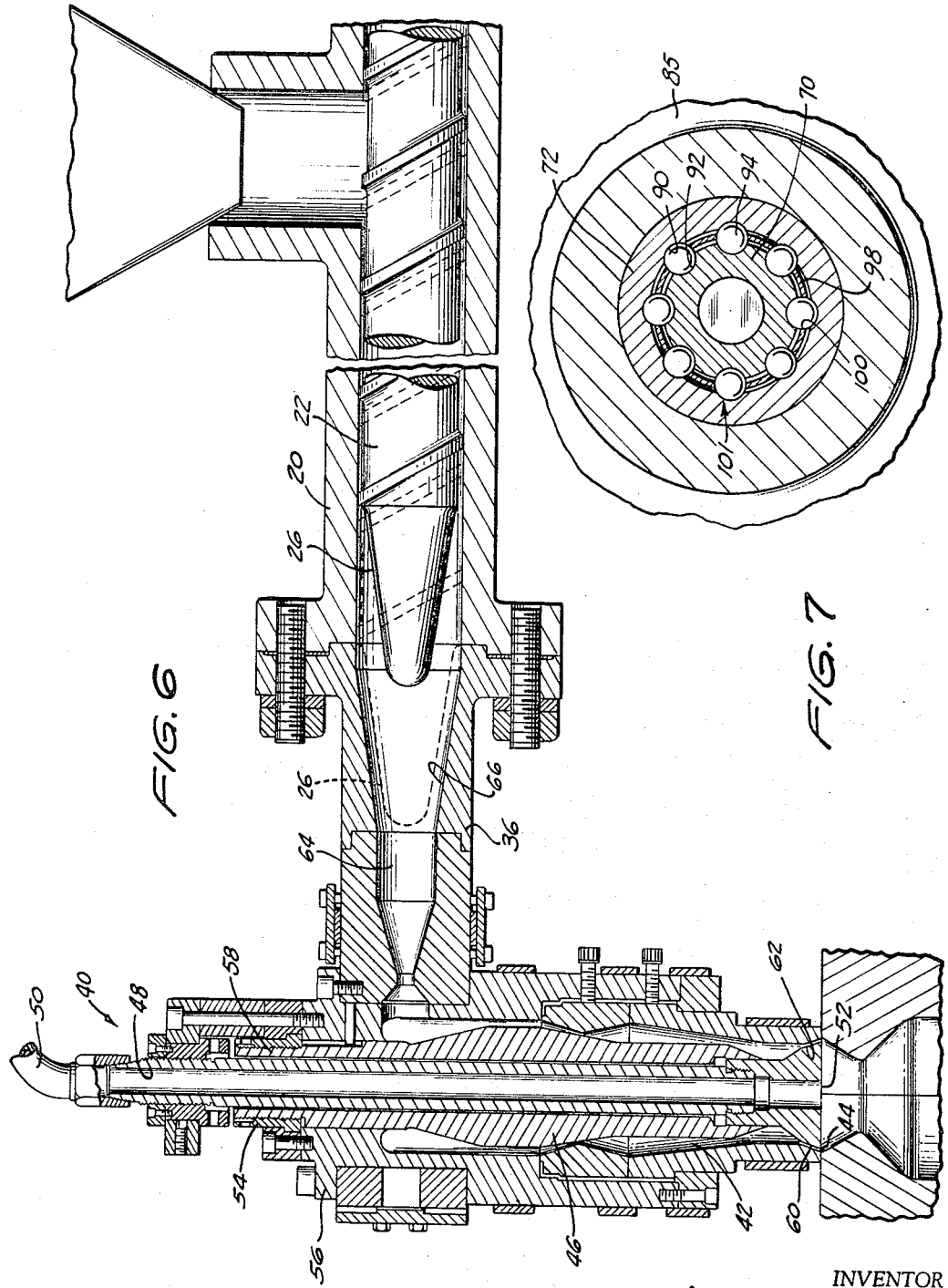
INVENTOR
*MERRITT W. MARTIN, Jr.*
BY *Olsen and Stephenson*
ATTORNEYS

INVENTOR
MERRITT W. MARTIN, JR.

BY Olsen and Stephenson
ATTORNEYS

Aug. 15, 1967  M. W. MARTIN, JR  3,335,457
BLOW MOLDING MACHINE WITH CONTINUOUSLY ROTATING
RECIPROCATING EXTRUDER SCREW
Filed Oct. 19, 1964  9 Sheets-Sheet 6

INVENTOR
MERRITT W. MARTIN, JR.

BY Olsen and Stephenson
ATTORNEYS

INVENTOR
MERRITT W. MARTIN, JR.

BY Olsen and Stephenson
ATTORNEYS

INVENTOR
MERRITT W. MARTIN, JR.
BY Olsen and Stephenson
ATTORNEYS

United States Patent Office 3,335,457
Patented Aug. 15, 1967

3,335,457
BLOW MOLDING MACHINE WITH CONTINUOUSLY ROTATING RECIPROCATING EXTRUDER SCREW
Merritt W. Martin, Jr., Saline, Mich., assignor to Hoover Ball and Bearing Company, Saline, Mich., a corporation of Michigan
Filed Oct. 19, 1964, Ser. No. 404,759
13 Claims. (Cl. 18—5)

ABSTRACT OF THE DISCLOSURE

A blow molding apparatus which has a continuously rotating reciprocating screw for discharging shots of plasticized material to a mold for blow molding a hollow product of desired shape. Control means are provided for starting the discharge stroke of the reciprocating screw in timed relation to opening of the molds and independent of the position of the screw. The extruder barrel and discharge die head are free of shut-off valves and a low friction drive connection is provided to permit continuous rotation of the screw as well as to reciprocate the screw at controlled rates and so that no leakage occurs at the die head during the filling stroke of the screw.

This invention relates generally to the art of extruding an extrudable material such as plastic and more particularly to an improved plastic molding machine.

In the production of products involving an intermittent extrusion of material from an orifice or die opening, such as blow molded products, a fast rate of extrusion is desirable for speed of production purposes. In the case of some materials, a smooth uninterrupted passage for material being extruded is essential, and the elimination of valves, accumulators and the like in the passage is also desirable to eliminate all leakage. Furthermore, the passage for the extrudable material is desirably maintained completely filled with material at all times, without any air pockets, to insure the production of quality products. It is an object of this invention, therefore, to provide an improved molding machine which has a low cycle time, is versatile in its adaptability to a wide range of materials, and is substantially leak proof.

The above objectives are obtained in the machine of this invention by providing an extruder with a continuously rotating screw which is mounted on a low friction support so that it can be reciprocated easily. The orifice through which material is extruded by the machine is connected to the extruder by a continuous uninterrupted and smooth passageway. As a result, on movement of the screw in a direction toward the orifice, the screw acts like a plunger to force a smooth flow of material through the passage and out the orifice. A hydraulic cylinder assembly is employed to move the screw in this direction, and when the screw has completed its movement the fluid force of the assembly thereon is relieved sufficiently to allow the screw to return. However, during return of the screw, which is accomplished by the pressure of material in the passage, which is continuously being supplied by the screw, a certain back pressure is continuously maintained on the screw by the cylinder assembly. The size of the orifice and the magnitude of the back pressure are adjusted to the particular material being extruded to insure that (a) there is no leakage of material from the orifice during back up of the screw, and (b) the screw backs up at a slow enough rate to insure a complete filling of the passage with material so that on the next plunger movement of the screw there will be no air in the material forced through the orifice.

In the machine of this invention, no valves or other obstructions are placed in the passage which extends between the screw and the discharge orifice, and this passage is smoothly contoured. This enables the use of the machine with a wide range of materials, some of which are sensitive to burning, color change and the like and must, therefore, be continuously moved along a smooth path. For example, polyvinylchloride, commonly referred to as "PVC," tends to burn and change color quickly if it becomes confined in a restricted space for any period of time. A discoloration of any portion of the material contaminates a large volume of the material. A machine which utilizes an "on-off" valve between the extruder and the die head orifice is, therefore, not usable with materials of this type.

A further object of this invention is to provide a blow molding machine which incorporates structure for automatically controlling the thickness of the parison being extruded.

Further objects, features and advantages of this invention will become apparent from a consideration of the following description, the appended claims, and the accompanying drawing in which:

FIGURE 4 is a fragmentary enlarged elevational view of a portion of the mechanism shown in FIG. 1, with some parts broken away and other parts shown in section for the purpose of clarity, illustrating parts in positions corresponding to a forwardly moved position of the extruder screw;

FIGURE 5 is a further enlarged elevational view of substantially the same portion of the machine of this invention which is illustrated in FIG. 4, showing the parts in positions corresponding to a retracted position of the extruder screw;

FIGURE 6 is an enlarged foreshortened sectional view of a portion of the machine of this invention looking substantially along the line 6—6 in FIG. 2;

FIGURE 7 is an enlarged fragmentary detail sectional view of a portion of the machine of this invention looking substantially along the line 7—7 in FIG. 4;

FIGURE 8 is an enlarged fragmentary view of a portion of the machine of this invention looking along the line 8—8 in FIG. 1;

Figure 1:
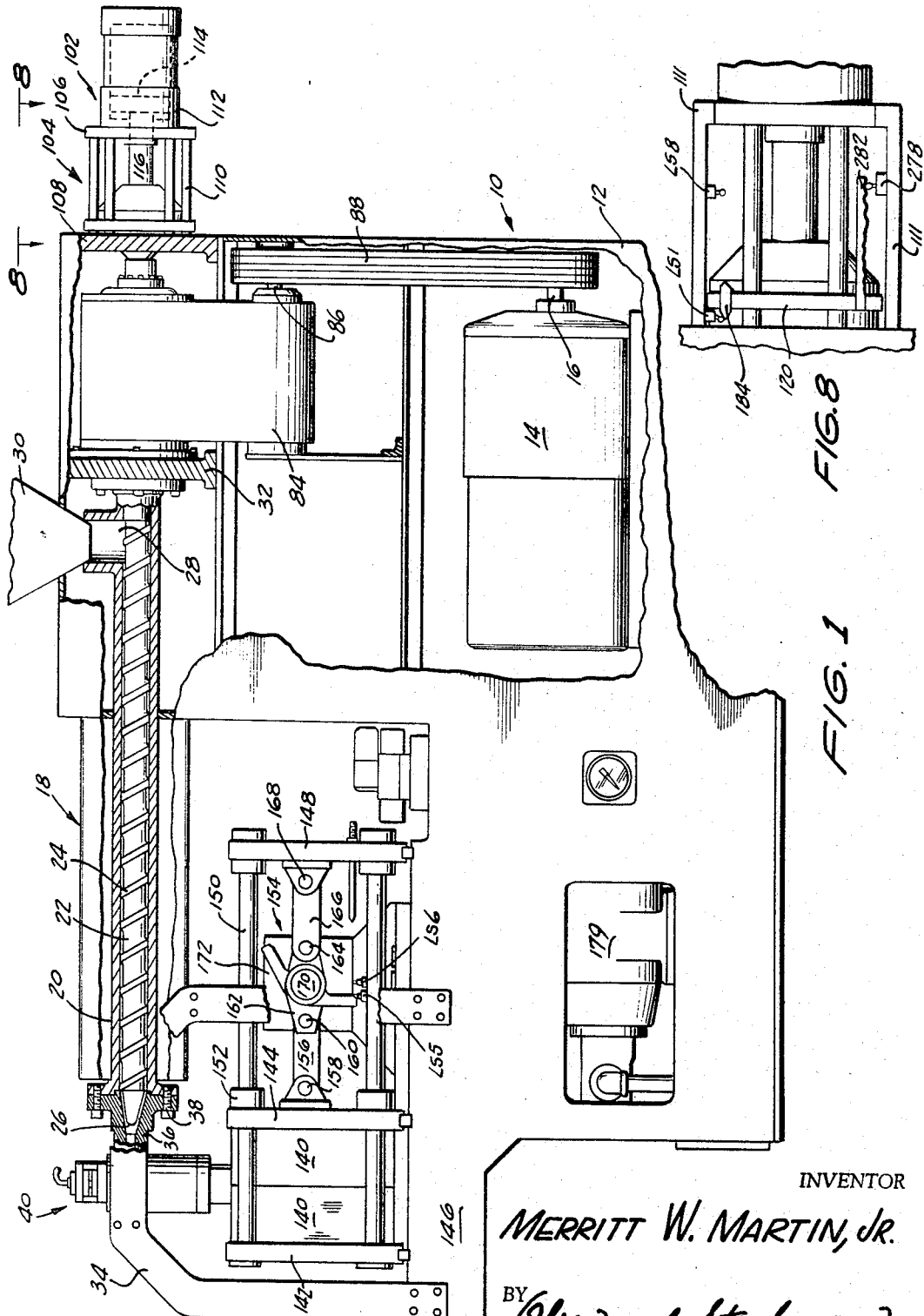
FIGURE 1 is a side elevational view of the improved molding machine of this invention, illustrating the extruder screw in a forwardly moved position, and with some parts broken away and other parts shown in section for the purpose of clarity.
Figure 2:
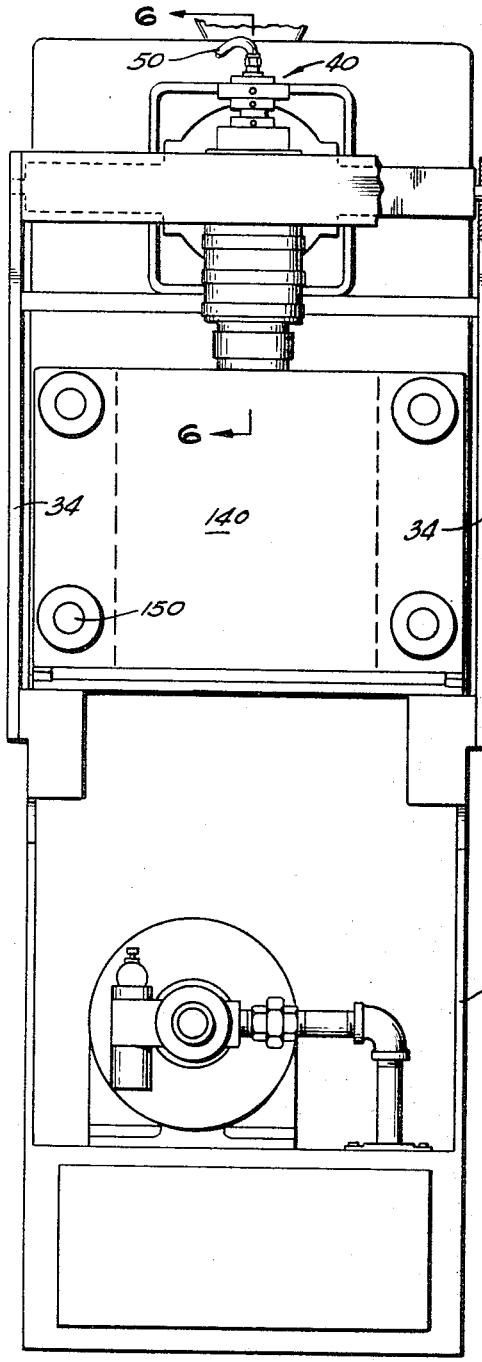
FIGURE 2 is an enlarged front view of the machine shown in FIG. 1.

With reference to the drawing, the machine of this invention, indicated generally at 10, is shown in FIG. 1 as including a main frame 12 which supports a drive motor 14 having a drive shaft 16. An extruder, indicated generally at 18, is also supported on the main frame 12 and includes an elongated barrel 20, which is heated by suitable heating elements that are conventionally used for this purpose and are therefore not shown in the drawing, and an elongated screw 22 having a continuous thread 24 and a smoothly curved forwardly projecting front end portion 26. The barrel 20 is formed at its rear end with an inlet opening 28 which communicates with a hopper 30 normally filled with a particled plastic material which is continuously fed to the barrel 20 through the opening 28. The rear end of the barrel 20 is supported on an upright frame member 32, which constitutes a portion of the main frame 12, and the front end of the barrel 20 is similarly supported on a frame assembly 34 which likewise constitutes a portion of the main frame 12.

A substantially horizontal passage member 36 (FIG. 6) is secured at one end to the forward end of the barrel 20 by means such as bolts 38 and is secured at its opposite end to an upright die head, indicated generally at 40. The die head 40 is formed with an interior smoothly contoured annular passage 42 (FIG. 6) which terminates at its lower end in an annular discharge orifice 44 and surrounds a central irregularly shaped mandrel 46. The mandrel 46 is formed with an axial passage 48 connected at its upper end to a supply of compressed air by a flexible tube or conduit 50 and terminating at its lower end in an air discharge nozzle 52 disposed axially of the annular discharge orifice 44. Mandrel 46 is vertically adjustable in response to adjustment of a nut 54 which is supported on a body 56 which forms part of the die head 40. Nut 54 is threadably engaged with a threaded portion 58 of the mandrel 46. Since the annular plastic discharge orifice 44 is formed by the spaced relation of annular inclined surfaces 60 and 62 on the mandrel 46 and the body 56, respectively, upward movement of the mandrel 46 relative to the body 56 is effective to reduce the size in cross section of the orifice 44 and downward movement of the mandrel 46 relative to the body 56 is effective to enlarge the cross sectional size of the orifice 44.

At its upper end, the die head passage 42 is in fluid communication with a continuous axially extending passage 64 in the passage member 36. The opposite end of the passage 64 communicates with and is in axial alignment with the interior of the barrel 20. A portion 66 of passage 64 is shaped so that it is complementary to the shape of the screw end portion 26. Consequently, when the screw end portion 26 is moved into the passage portion 66, as shown in broken lines in FIG. 6, a uniform pressure is exerted on the material in the passage 64 tending to force material in the passage 64 and the die head passage 42 through the discharge orifice 44.

It can thus be seen that when the screw 22 is moved forwardly, from its solid line position to its broken line position, shown in FIG. 6, it acts like a plunger to force material in the passages 64 and 42 through the discharge orifice 44. With the screw 22 in its forwardly moved position shown in broken lines in FIG. 6, a fluid pressure of sufficient magnitude can be developed in the passage 64 to move the screw 22 rearwardly toward its solid line position shown in FIG. 6, as explained more in detail hereinafter.

The rear end of the screw 22, which is rotatably supported in the portion of the barrel 20 which is attached to the frame member 32, is provided with a rearwardly extending axial extension 70 hereinafter termed the "quill" for the screw 22. The quill 70 is telescopically positioned within a hollow sleeve 72 which is provided on its radially outer surface with a mounting flange 74 which is secured by bolts 76 to one end of an annular drive tube 78. The opposite end of drive tube 78 is secured to a bearing 80 telescoped on screw 22 and provided with a seal 82 which engages screw 22. A similar seal 83, carried by sleeve 72 engages 70.

A drive gear 85 fixedly secured to drive tube 78 intermediate the ends thereof, meshes with speed reduction gearing 87 in a reduction unit 84 mounted on the main frame 12 at a position below the drive tube 78. The gear reduction unit 84 has an input shaft 86 driven by a plurality of belts 88 which are in turn driven by the motor drive shaft 16. As a result, rotation of the motor drive shaft 16 is effective to provide for driving of unit 84 which in turn provides for rotation of the drive tube 78 which in turn rotates the sleeve 72 to which it is secured.

As shown in FIG. 7, the radially inner surface of the sleeve 72 is formed with a plurality of longitudinally extending grooves 90, and similar grooves 92 are formed in the radially outer surface of the quill 70 at positions in radial alignment with the grooves 90. A plurality of balls 94, arranged in rows 96 which are parallel to the axis of shaft 24 (FIGS. 4 and 5), are positioned in the grooves 90 and 92 and a retainer sleeve 98 is positioned intermediate the quill 70 and the sleeve 72 and formed with openings 100 through which the balls 94 project for maintaining the balls 94 in each row 96 in a spaced relation in which adjacent balls are out of contact with each other. The openings 100 in the sleeve 98 are slightly smaller than the diameter of the balls 94 which are inserted into the openings 100 from positions within the sleeve 98. As a result, the sleeve 98 is retained by the balls 94 in the position shown in FIG. 7 in which it is spaced from both the quill 70 and the sleeve 72.

It can thus be seen that the balls 94 cooperate with the quill 70 and the sleeve 72 to provide for a ball spline connection between the quill 70 and the sleeve 72. As a result, the balls 94 and the spacer sleeve 98 constitute a ball spline assembly 101 which provides for rotational driving of the quill 70, and thus the screw 22, by the sleeve 72. As a result, any rotation of the drive member 78 is effective to provide for an identical rotation of the screw 22. However, the balls 94 in the ball spline assembly 101 also provide for relative axial movement of the quill 70 and the sleeve 72 during concurrent rotation of these members. Since the sleeve 72 is maintained in a fixed longitudinal position on the frame 12, during reciprocal movement of the quill 70, it is rollingly supported on the balls 94. This arrangement permits reciprocal movement of the screw 22 in response to a small axial force on the screw 22 by virtue of the low friction support of the quill 70 on the balls 94.

A hydraulic cylinder assembly 102 (FIGS. 1 and 8) is mounted on a guide frame 104 secured to the main frame 12. The guide frame 104 includes a pair of upright frame members 106 and 108 (the member 108 also constituting part of main frame 12) which are connected by horizontal guide rods 110 which position the upright frame member 106 in a rearwardly spaced relation with the main frame 12. Horizontal frame rods 111 also extend between the frame members 106 and 108.

The cylinder assembly 102 includes a cylinder 112 which is secured to the frame member 106 at a position in substantially horizontal alignment with the quill 70. A piston 114 in the cylinder 112 has a piston rod 116 which is secured at its outer end to a thrust member 118 (FIGS. 1 and 5). A guide plate 120, slidably supported on the guide rods 110 is connected, such as by bolts 122, to the thrust member 118 so as to guidably support it for horizontal reciprocal sliding movement on the guide rods 110. A second thrust member 124 is telescoped within the outer end of the thrust member 118 and a thrust bearing assembly 126 is disposed between the thrust members 118 and 124 for transmitting horizontal forces from one to the other. The quill 70 is press fit within a cavity 128 in the thrust member 124 so that it is secured thereto, and the quill 70 extends through thrust member 124 and is rotatably supported in a bearing 132 carried by the thrust member 118.

It can thus be seen that when the piston rod 116 is extended out of the cylinder 112, it exerts an axial thrust on the thrust member 118. This thrust is transferred to the quill 70 through the thrust bearing 126 and the second thrust member 124. Consequently, the quill 70 and the screw 22 to which it is attached, are moved to the left which is herein described as a forward direction. On the application of an oppositely directed force to the screw 22, which can be continuously rotated so that the thrust member 124 is rotating relative to the thrust member 118, the screw 22 is moved to the right in FIG. 1 which is herein described as a rearward direction, to in turn move the quill 70 and the thrust member 124 to the right. This thrust force on the member 124 is transmitted through the thrust bearing 126 to the thrust member 118 and thus to the piston rod 116. As a result, the piston rod 116 is moved into the cylinder 112. It can thus be seen that the hydraulic cylinder assembly 102 is operable to move the screw 22 in a forward direction so that it acts like a plunger to force material through the discharge orifice 44. During such movement, the screw 22 is continuously rotatable by the drive tube 78 by virtue of the disposition of the thrust bearing 126 between the screw 22 and the hydraulic cylinder assembly 102. The sleeve 98 in ball spline assembly 101 is confined between a pair of longitudinally spaced stops 103 and 105 carried by drive tube 78. On forward movement of quill 70 (FIG. 4) one end of spacer sleeve 98 is engageable with stop ring 103, and on rearward movement of quill 70 (FIG. 5), the opposite end of sleeve 78 is engageable with stop ring 105.

Figure 9:
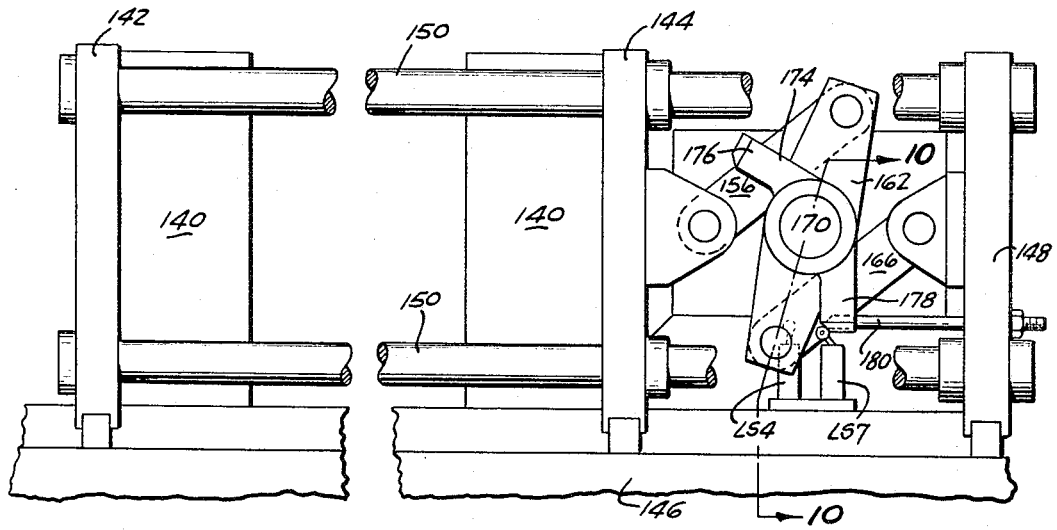
FIGURE 9 is an enlarged fragmentary elevational view of a portion of the machine of this invention showing parts in positions corresponding to a "mold open" position of the mold carrying platens.
Figure 10:
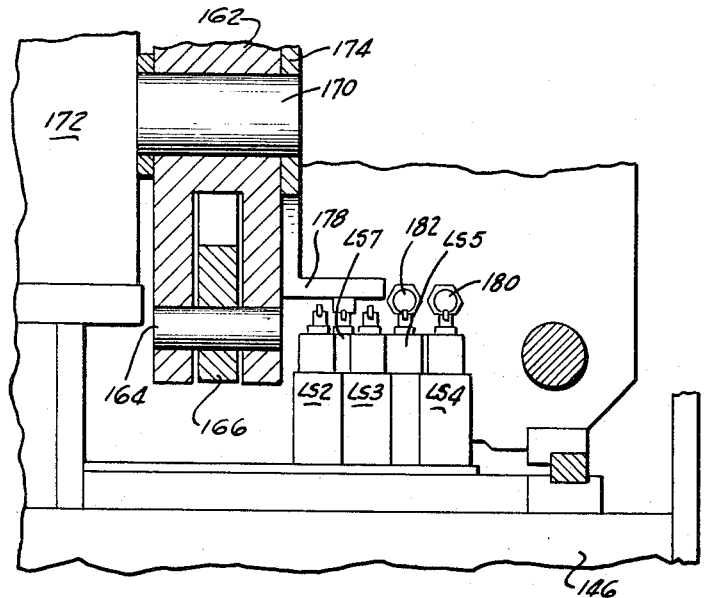
FIGURE 10 is an enlarged fragmentary sectional view of a portion of the machine of this invention looking along the line 10—10 in FIG. 9.

A pair of horizontally movable mold sections 140 are mounted on the main frame 12 at a position below the discharge orifice 44. The mold sections 140 are movable between horizontally spaced positions shown in FIG. 9, and engaged positions, shown in FIG. 1. During operation of machine 10, when the mold sections 140 are horizontally spaced as shown in FIG. 9, they are disposed on opposite sides of a downwardly extending tube of plastic, commonly referred to as a parison, which is suspended from the die head 40 and which has been extruded through the die head discharge orifice 44. In the engaged positions of the mold sections 140 shown in FIG. 1, they cooperate to form a mold cavity (not shown) which surrounds the parison suspended from the die head 40. Air is then discharged from nozzle 52 to blow the parison into conformity with the mold cavity in the mold sections 140. It is to be understood that while the machine 10 is illustrated with a single die head 40, for convenience of description, a plurality of die heads 40 are usable with the machine and in such event a corresponding number of cavities are formed in the mold sections 140.

*Mold opening and closing mechanism*

The specific apparatus disclosed for opening and closing the mold formed by the sections 140, namely, the apparatus for moving the mold sections 140 between their engaged positions shown in FIG. 1 and their spaced positions shown in FIG. 9, forms no part, by itself, of the present invention, but a description of this apparatus follows since an understanding thereof is necessary to an understanding of the operation of the machine 10. The mold sections 140 are removably mounted on a pair of platens 142 and 144 which are slidably mounted on a horizontal portion 146 of the main frame 12 located at the front end of the machine 10. A third platen 148 is similarly mounted on the main frame portion 146 and is spaced inwardly of the machine 10 from the platen 144.

The platens 142 and 148, hereinafter referred to as "end platens" are rigidly connected by four tie bars 150 which extend through the platens 142 and 148 and are adjustably connected thereto for maintaining the end platens in a desired horizontally adjusted spaced relation. The tie bars 150 extend through the center platen 144 adjacent the corners thereof, and the center platen 144 carries bushings 152 through which the tie bars 150 extend, to insure a free sliding movement of the tie bars through the center platen 144.

A mold actuating mechanism, indicated generally at 154, is provided for opening and closing the mold formed by the mold sections 140. The mechanism 154 includes a link 156 which is pivotally connected at one end, by a pin 158, to the center platen 144. The opposite end of the link 156 is pivotally connected, by a pin 160, to one end of an arm 162, the opposite end of which is pivotally connected by a pin 164 to one end of a link 166. The opposite end of link 166 is pivotally connected by a pin 168 to the end platen 148. Intermediate its ends, substantially midway between the pins 160 and 164, the arm 162 is fixedly secured to a shaft 170 which is driven by and mounted on a hydraulic motor unit 172. The unit 172 is of conventional reversible type connected to a hydraulic pump unit 179 and operable to rotate the shaft 170 in both clockwise and counterclockwise directions.

A switch actuating member 174, having a pair of legs 176 and 178 (FIG. 9) which extend radially outwardly from the shaft 170, is also fixed on the shaft 170. The hydraulic motor unit 172 is connected to a hydraulic pump unit 179 which is mounted on the main frame 12 for supplying fluid under pressure to the unit 172. The links 156 and 166 are of substantially equal effective lengths and are connected at 160 and 164, respectively, to points on the arm 162 spaced equally from the axis of shaft 170 so that links 156 and 166 are at all times parallel. Links 156 and 166 and the arm 162 constitute a toggle mechanism, which when straightened, as shown in FIG. 1, moves the platens 144 and 148 the maximum distance apart, to close the mold formed by the mold sections 140. When the arm 162 is moved to a position such as shown in FIG. 9, in which the links 156 and 166 are relatively folded, the platens 144 and 148 are moved toward each other to move the mold sections 140 away from each other and open the mold formed thereby.

On rotation of the shaft 170 in a counterclockwise direction, as viewed in FIG. 9, from the position of the arm 160 at an angle to the horizontal as shown in FIG. 9, the arm 162 moves the links 156 and 166 toward positions in which they are in substantially horizontal alignment, as shown in FIG. 1. During such movement, the center platen 144 and the end platen 148 are moved horizontally in directions away from each other. Since the end platen 142 is connected to the end platen 148, during movement of the platen 148 away from the center platen 144, the platen 142 is moved toward the platen 144. When the links 156 and 166 have been moved into nearly horizontal alignment, the mold sections 140 have been moved into positions in which they are touching or nearly touching so that they close the lower end of a parison suspended from the die head 40. The mold sections 140 are at this time in "mold closed" positions. On further rotation of the shaft 170 in a counterclockwise direction as viewed in FIG. 9, the links 156 and 166 are moved into alignment so that the mold sections 140 are tightly engaged and are in what is referred to as "mold locked" positions maintained by the toggle mechanism, which moves the platens into this latter position with such force that the tie bars 150 are stretched. When the shaft 170 is rotated in an opposite direction, namely clockwise, as viewed in FIG. 1, from the position shown in FIG. 1, the links 156 and 166 are moved toward relatively folded positions for moving the mold sections 140 at a distance apart sufficient to permit plastic articles formed in the mold and suspended from die head 40 to be moved downwardly between the mold sections 140.

Five limit switches indicated at LS2, LS3, LS4, LS5, and LS7, are mounted on the main frame 12 at a position adjacent the shaft 170. The switch LS7 is adapted to be actuated by the leg 178 on the switch actuating member 174 in the position of the member 174 shown in FIG. 9. Switches LS2 and LS3 are positioned for actuation by the leg 176 of the actuating member 174. LS2 is positioned so that it is actuated by leg 176 in the position of the mold actuating mechanism 154 corresponding to "mold closed" position of the mold sections 140. Switch LS3 is positioned so that when mechanism 154 is in a position corresponding to "mold locked" position of the mold sections 140, LS3 is actuated by leg 176, and in this position of leg 176, LS2 is still engaged by leg 176.

Limit switches LS4 and LS5 are positioned for actuation by a pair of mold actuating rods 180 and 182, respectively, which are mounted in a side-by-side relation on the end platen 148, during movement of platen 148 from its position shown in FIG. 1 to its position in FIG. 9, and the effective lengths of the rods 180 and 182 are adjustable to provide any desired sequence of actuation.

A pair of limit switches LS1 and LS8 are mounted on one of the frame rods 111 on which the hydraulic cylinder assembly 102 for advancing the screw 22 is mounted. LS1 is positioned so that it is actuated by an actuating rod 184 secured to the guide plate 120 in the forward position of the screw 22. In the retracted position of the screw 22, during normal operation of machine 10, the actuating member 184 is short of a position in which it would actuate LS8, which is actuated only for safety purposes when screw 22 has been retracted an excessive distance.

Figure 15:
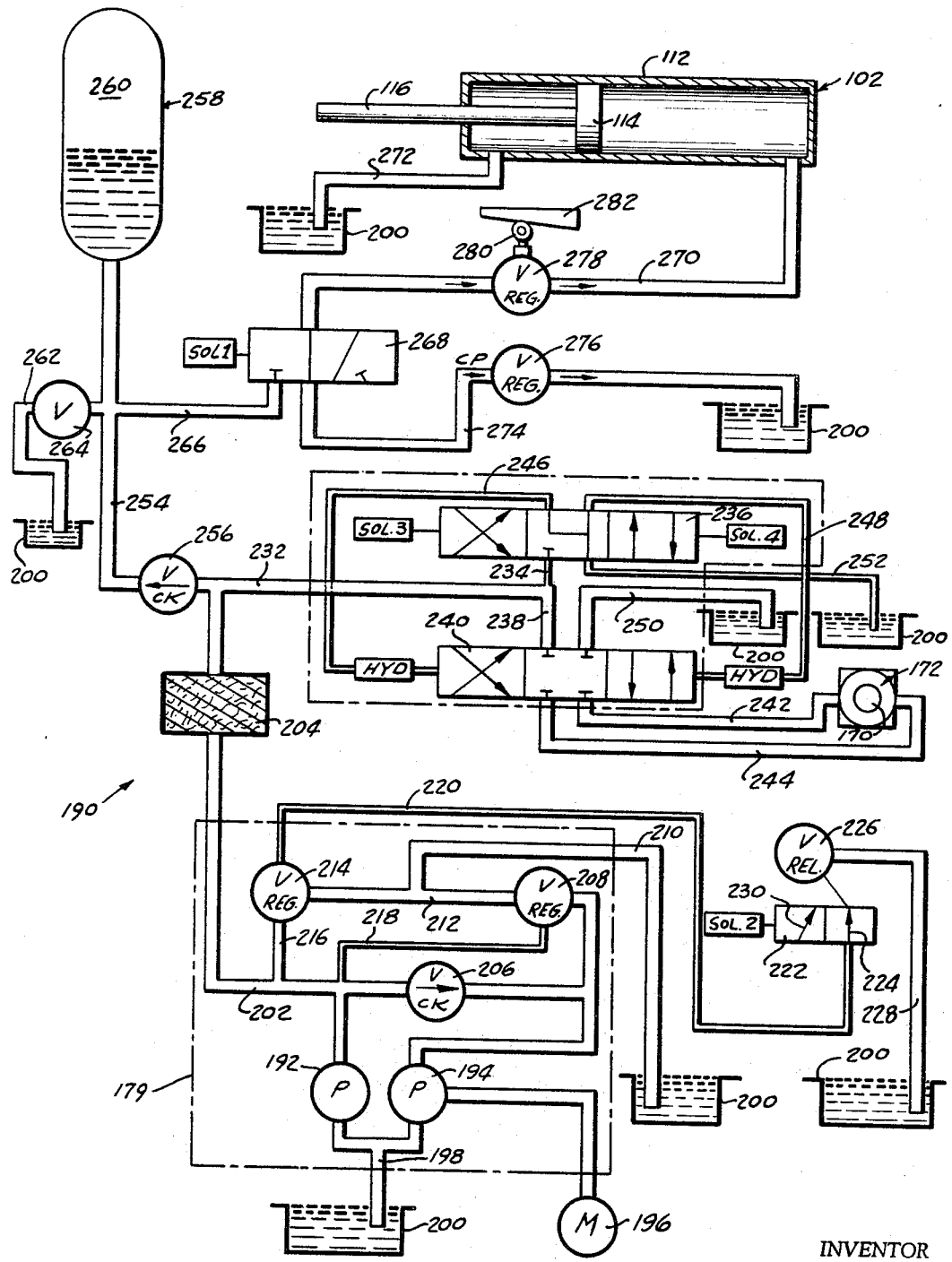
FIGURE 15 is a circuit diagram showing the hydraulic circuit utilized in the machine of this invention.

A description of the hydraulic circuit for the machine 10, which is indicated generally at 190 in FIG. 15, follows. In the circuit 190, the hydraulic pump unit 179 consists of a pair of pumps 192 and 194 driven by a motor 196 and supplied with fluid from an inlet line 198 disposed in a fluid reservoir or tank 200. The pump 192, which is of low volume high pressure type, supplies fluid to a conduit 202 in which a filter 204 is positioned. The pump 194, which is of high volume low pressure type, supplies fluid to the conduit 202 at a position spaced from the connection of the pump 192 to the conduit 202, and a one-way check valve 206 is positioned in the conduit 202 between the pumps 192 and 194. The conduit 202 is connected at one end to a pressure regulating valve 208 which is connected by a conduit 212 to another pressure regulating valve 214. A conduit 210 extends between the conduit 212, at a position between the valves 208 and 214, and the reservoir 200. The conduit 202, at a position to one side of the check valve 206, is connected by a conduit 216 to the valve 214 and by a pilot line 218 to the regulating valve 208.

A pilot line 220, which is connected to a two-position valve body 222 that is actuated by a solenoid, designated solenoid #2, is also connected to regulating valve 214. When solenoid #2 is de-energized, it is in the position shown in FIG. 15 in which a passage 224 therein communicates with a pressure regulating valve 226 that is connected by a conduit 228 to the reservoir 200. When solenoid #2 is energized, a passage 230 in valve body 222 is connected to conduit 220 but not valve 226, so that communication between conduit 220 and valve 226 is terminated. In one embodiment of the invention, the pressure regulating valve 226 is adjusted to open at a selected pressure between 50 and 200 p.s.i., the pressure regulating valve 208 opens at about 300 p.s.i., and the pressure regulating valve 214 opens at about 1000 p.s.i.

When the pressure in line 202 exceeds 300 p.s.i., the pressure setting for valve 208, the fluid in pilot line 218 opens valve 208, closes check valve 206, and pump 194 pumps through line 210 to reservoir 200. When valve body 222 is in the position shown in FIG. 15, the pressure in valve 214 is equalized and the pressure in conduit 202 cannot exceed this pressure. In this condition of valve 214, some fluid flows into conduit 212 to tank 200. When valve body 222 is shifted to block pilot line 220, the valve 214 will not direct fluid to line 212 until the pressure in conduit 202 exceeds the pressure setting of valve 214, namely, 1000 p.s.i. in one embodiment of this invention. It can thus be seen that solenoid #2 functions to determine the presure in conduit 202 and the volume of fluid supplied to conduit 202. When solenoid #2 is de-energized, a large volume of fluid is available to be supplied to the line 202, but the pressure of this fluid is relatively low; and when solenoid #2 is energized, the volume of fluid which is available to be supplied to conduit 202 is reduced and the pressure of this fluid can be increased to a higher pressure.

The conduit 202 is connected to a conduit 232 which communicates through a pilot passage 234 with a valve body 236 which is actuated by two solenoids designated solenoid #3 and solenoid #4. The conduit 232 also communicates through a conduit 238 with a hydraulically actuated valve body 240 which communicates through conduits 242 and 244 with the reversible hydraulic motor unit 172. When solenoid #4 is energized, valve body 236, which is shown in a neutral position in which conduit 234 is blocked, is moved to the left as shown in FIG. 15 so that fluid from the conduit 234 flows through the valve body 236 into a pilot passage 246 which communicates with the left side of the valve body 240. Fluid in pilot line 246 operates to move the valve body 240 to the right, as viewed in FIG. 15, from its illustrated neutral position. In a position of valve body 240 moved to the right from its netutral position shown in FIG. 15, fluid from conduit 238 flows through valve body 240 to the conduit 242 so as to rotate the shaft 170 for the hydraulic motor unit 172 in a clockwise direction as viewed in FIGS. 1 and 9.

When solenoid #3 is energized, the valve body 236 is moved to the right, as viewed in FIG. 15, so that actuating fluid from pilot conduit 234 flows through valve body 236 into a pilot passage 248 which communicates with the right-hand end of valve body 240. In response to fluid pressure in pilot line 248, valve body 240 is moved to the left from its neutral position illustrated in FIG. 15. In such a position, fluid from conduit 238 flows through valve body 240 into conduit 244 to rotate shaft 170 in a counterclockwise direction. A tank conduit 250 communicates with valve body 240 and a tank conduit 252 similarly communicates with valve body 236.

The conduit 232 is connected to a conduit 254 which has a one-way check valve 256 in it which prevents flow of fluid in a direction from conduit 254 into conduit 232. The conduit 254 is connected to a hydraulic-pneumatic accumulator 258, an upper end portion 260 of which is filled with a gas such as nitrogen. The purpose of the accumulator 258 is to provide for a storage of a volume of hydraulic fluid under pressure which can be discharged quickly to the hydraulic cylinder assembly 102 so as to provide for a rapid forward movement of the piston 114. A conduit 262, connected to the conduit 254, has a manual drain valve 264 interposed in it and is connected to the reservoir 200. The valve 264 is normally closed and is. open only when the cylinder 112 is to be drained.

Another conduit 266 which connects to the conduit 254 also communicates with a movable valve body 268 which is shiftable in response to energizing of a solenoid designated solenoid #1. When solenoid #1 is energized, conduit 266 is blocked at valve body 268, as shown in FIG. 15. When solenoid #1 is de-energized, valve body 268 is shifted to the left as shown in FIG. 15 to a position in which conduit 266 communicates through valve body 268 with a conduit 270 that is connected to the cylinder 112 adjacent the rear end thereof. Consequently, when solenoid #1 is de-energized, fluid from the hydraulic pump unit 179 and the accumulator 258 can flow through the conduit 270 into the cylinder 112 so as to move the piston 114 in a direction to move the screw 22 forwardly. During such movement of piston 114, any fluid in cylinder 112 on the rod side of piston 114 is forced out through a conduit 272 which communicates with the reservoir 200.

When the piston 114 is moved in an opposite direction, by the pressure of the plastic in the pasage 64 on the front end 26 of the screw 22, fluid is forced out of the cylinder 112 through the line 270 and the valve body 268 into a conduit 274 which communicates with the reservoir 200. The conduit 274 has a pressure regulating valve 276 interposed in it which is adjusted to limit the flow of fluid through conduit 274 to thus also limit the rate at which the piston 114 can be moved rearwardly in the cylinder 112. The function of the valve 276 is, therefore, important to proper functioning of the machine 10, since it is adjusted to maintain hydraulic back pressure on screw 22 and limit the rate at which the screw 22 is moved rearwardly by the pressure of plastic in the passage 64 to a rate corresponding to the rate at which the screw 22 fills passage 64 with plastic. A passage 64 filled with plastic and without any air voids is thus insured.

The conduit 270 has a pressure reducing valve 278 positioned in it which is adjusted in response to movement of a cam follower 280 which is attached to the valve 278. The cam follower 280 is positioned in engagement with a cam 282 secured to the guide plate 120 which is supported on the guide rods 110 (FIG. 8). The purpose of the valve 278 is to provide for a control of the thickness of a parison being extruded through the annular discharge orifice 44. The greater the fluid pressure on the piston 114, the higher the pressure on the plastic in the passages 42 and 64 which communicate with the die opening 44. The higher this pressure the greater the density of the plastic being extruded through the opening 44 and the greater the density of this plastic the thicker the parison. Consequently, the cam 282 is contoured to provide for a pressure adjustment in conduit 270 which provides the desired thickness variation in each parison extruded from the die discharge orifice 44 during each forward movement of the screw 22.

Machine pneumatic circuit

The air system for the machine 10, indicated generally at 300 in FIG. 11, will now be described. In the system 300, a conduit 302 is connected to a suitable source of air under pressure (not shown), and to three branch conduits 304, 306, and 310. The conduit 304 has a pressure regulator 312 interposed in it which is set to limit the pressure in the conduit 304 to a predetermined pressure which in one embodiment of the invention is between 80 and 100 p.s.i. A conduit 322 connected to conduit 304 is also connected to a valve body 326 which is connected by the conduit 50 to the blow passage 48 in the die head 40. The conduit 50 thus communicates through the air discharge nozzle 52 (FIG. 6) with the interior of the parison which is blown to form the plastic article, indicated at 328 in FIG. 11. The valve body 326 is also connected to an exhaust conduit 330.

Figure 11:
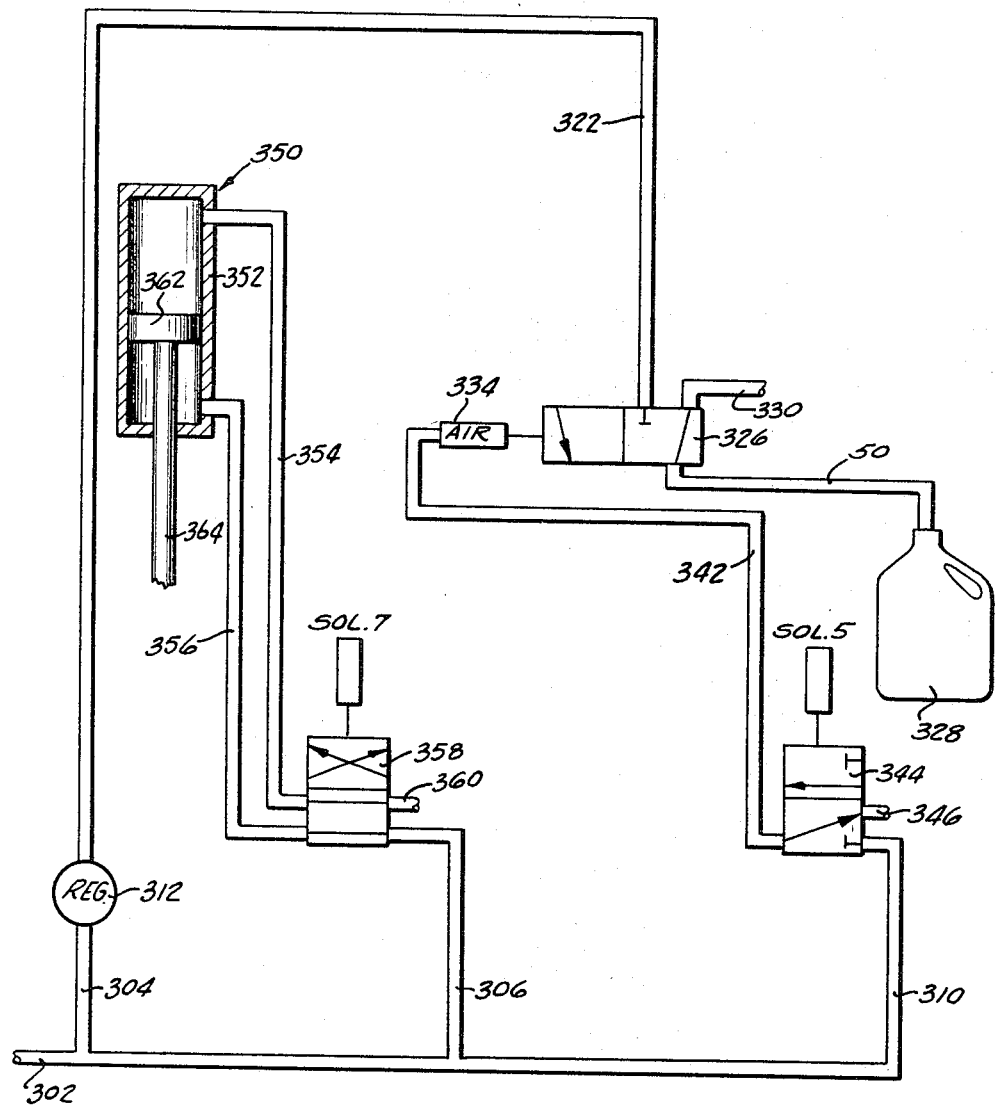
FIGURE 11 is a diagrammatic view showing the compressed air circuit used in the machine of this invention.

As shown in FIG. 11, the valve body 326 is provided with an air actuator 334. When no air is being supplied to actuator 334, the valve body 326 is in the position shown in FIG. 11 in which conduit 50 communicates with exhaust conduit 330. When air is supplied to the actuator 334, the valve body 326 is moved to the right in FIG. 11 to a position in which the conduits 322 and 50 are communicated through the valve body 326, so that blowing air is supplied to a parison depending from nozzle 44.

The air actuator 334 is connected by a conduit 342 to a valve body 344, the position of which is controlled by a solenoid designated solenoid #5. The valve body 344 is connected to an exhaust conduit 346 and to the air supply conduit 310. When solenoid #5 is de-energized, valve body 344 is in the position illustrated in FIG. 11, in which position the air actuator 334 is connected through the valve body 344 to the exhaust conduit 346. When solenoid #5 is energized, the valve body 344 is moved downwardly, as viewed in FIG. 11, to a position in which air under pressure from the line 310 can flow through the valve body 344 and the conduit 342 to the actuator 334 so as to move the valve body 326 to the right as shown in FIG. 11 to a position in which the conduit 50 is connected through the valve body 326 to the air supply passage 322.

The die head 40 is provided with a conventional stripper assembly (not shown) which surrounds the discharge nozzle 44 and is movable downwardly into engagement with a blown plastic article 328 so as to separate it from the plastic in the nozzle 44 at the conclusion of the formation of the article 328. Since such a stripper assembly forms no part of the present invention, and is shown and described in copending application Ser. No. 236,382, filed Nov. 8, 1962, a full disclosure thereof is omitted from this application. The air actuator cylinder assembly 350 which actuates the stripper assembly is, however, illustrated in FIG. 11 since the stripper assembly must be operated in a timed relation with the other components of the machine 10. The cylinder assembly 350 consists of a cylinder 352 connected at opposite ends to conduits 354 and 356 which are connected to a valve body 358. The valve body 358 is connected to an exhaust conduit 360 and the air supply conduit 306. A solenoid, indicated generally as solenoid #7, controls the position of the valve body 358. When solenoid #7 is de-energized, the valve body 358 is in the position shown in FIG. 11 in which air under pressure from conduit 306 is supplied to conduit 356 to move a piston 362, having a piston rod 364, upwardly in cylinder 352. The stripper assembly (not shown) is connected to the piston rod 364 and is thus moved upwardly to an inoperative position when the valve body 358 is in the position shown in FIG. 11. When solenoid #7 is energized, valve body 358 is moved downwardly to communicate conduit 354 with air supply passage 306 and communicate conduit 356 with exhaust conduit 360. In this position of valve body 358, the piston rod 364 is moved downwardly to actuate the stripper assembly so as to strip the blown plastic article 328 from the die head 40.

Operation

Figure 12:
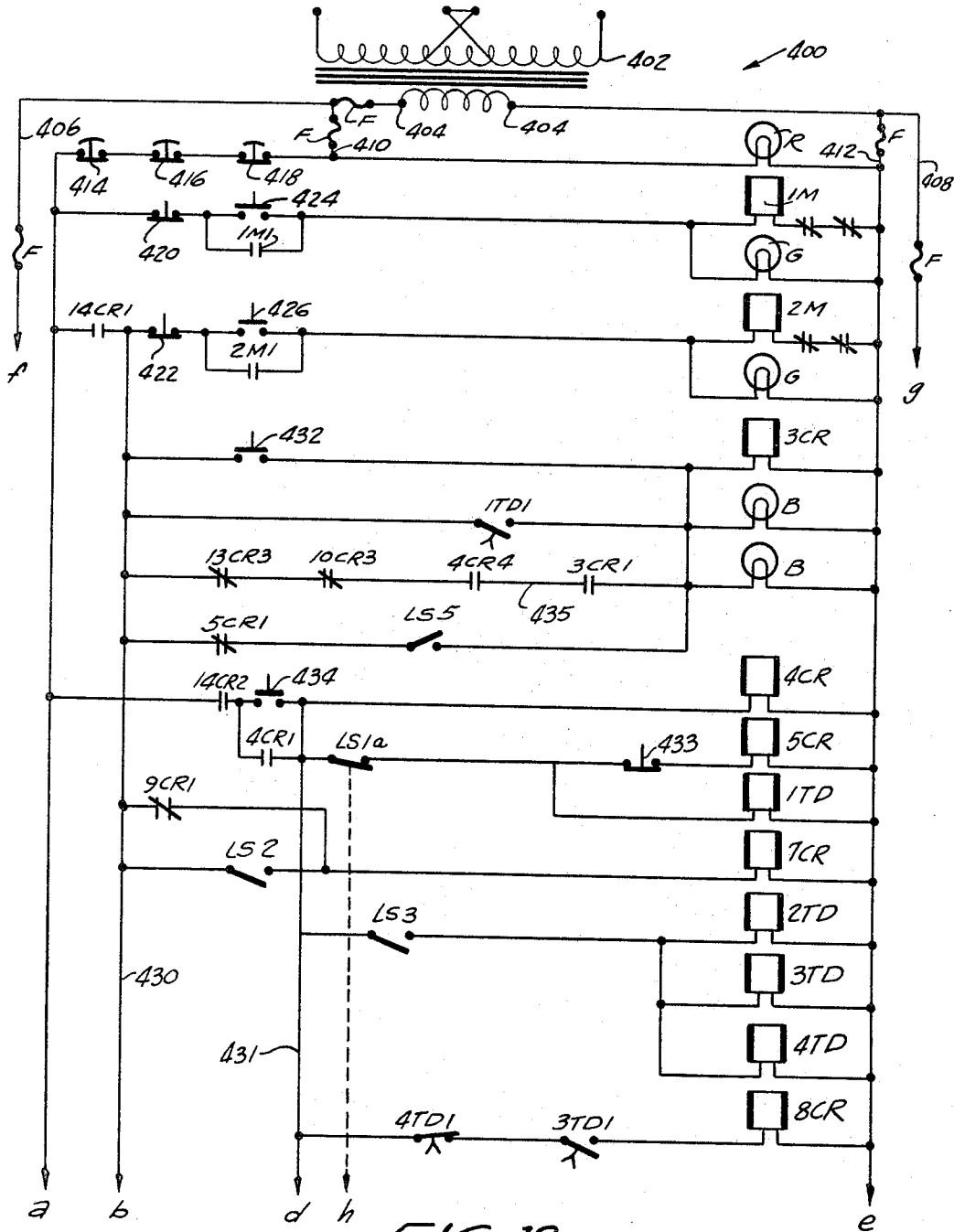
FIGURES 12, 13 and 14 are circuit diagrams showing the electrical circuit used in the machine of this invention.
Figure 13:
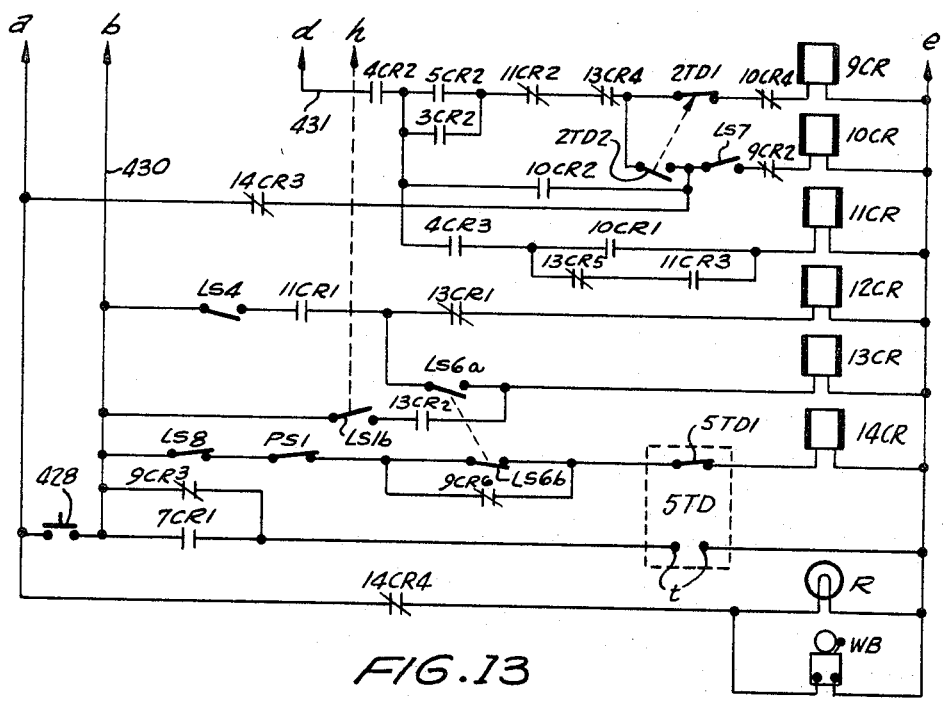
Figure 14:
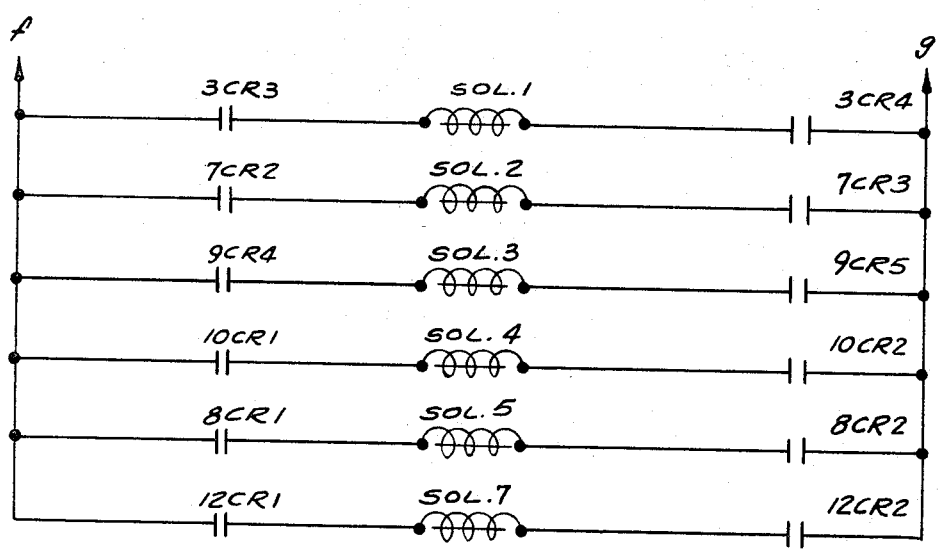

The operation of the machine 10 is controlled by an electrical control circuit, the components of which are mounted on the moving parts of the machine and on a control panel (not shown) mounted either on the machine main frame 12 or on a separate frame adjacent the machine 10. Three portions of the control circuit, indicated generally at 400, are illustrated separately in FIGS. 12, 13 and 14 for purposes of clarity, since the circuit 400 is too large to illustrate in a single view. A three phase supply line (not shown) is connected to a transformer 402 having terminals 404 connected to leads 406 and 408 in which fuses F are interposed. The leads 406 and 408 are connected through conductors 410 and 412, respectively, having fuses F therein, to the portions of the control circuit 400 shown in FIGS. 12 and 13. The portion of the circuit 400 shown in FIG. 12 is connected to the portion shown in FIG. 13 at the points indicated at a, b, d, h, and e. The leads 406 and 408 are also connected, at the points indicated at f and g, with a portion of the circuit 400 shown in FIG. 14.

Assume that the mold sections 140 are in spaced apart positions so that the platens 142, 144 and 148 are in the positions illustrated in FIG. 9, the stripper assembly actuated by the piston rod 364 is up, and the screw 22 is in its forwardly moved position illustrated in FIGS. 1, 4 and 8. In this condition of machine 10, switches LS2, LS3, LS5 and LS7 are open and switches LS4 and LS8 are closed. Switch LS1 has two sets of contacts, LS1a, which are closed at this time and LS1b, which are open. A limit switch LS6, having two sets of contacts LS6a and LS6b is positioned adjacent the stripper mechanism operated by the piston rod 364, and in this position of the machine with the stripper mechanism up, contacts LS6a are opened and LS6b are closed.

The machine 10 is started by closing three emergency stop switches 414, 416 and 418. The switch 414 is located on the main control panel (not shown), the switch 416 is located on one side of the machine within reach of an operator viewing the movement of the mold sections 140, and the stop switch 418 is located at a corresponding position on the opposite side of the machine. Stop switches 420 and 422 are closed, and motor start switches 424 and 426 are at this time open. When switch 424 is closed, a relay 1M for the pump motor 196 is energized so as to close normally open locking contacts 1M1, and start the motor 196. When the switch 426 is closed, a relay 2M for the extruder motor 14 is energized to start the motor 14, so that screw 22 starts rotating, and close the normally open locking contacts 2M1 for relay 2M. Switches 424 and 426 are then released. Signal lights G in parallel with the motor relays 1M and 2M are lit when the relays are energized. To provide for energizing of relay 2M in response to closing of switch 426, a manually operated safety switch 428 (FIG. 13) is first momentarily closed to energize control relay 14CR to close normally open contacts 14CR1 which are in series with start switch 426, close normally open contacts 14CR2 and open normally closed contacts 14CR3 and 14CR4. Safety switch 428 then remains open during automatic operation of machine 10, and 14CR remains energized through conductor 430.

A manual switch 432 is then closed to temporarily complete a circuit between conductors 430 and 412 and energize 3CR. Indicating lights B become lighted, and normally open contacts 3CR1, 3CR2, 3CR3 and 3CR4 are closed. Closing of normally open contacts 3CR3 and 3CR4 provides for energizing of solenoid #1 to provide for movement of valve body 268 to the position shown in FIG. 15 in which fluid from cylinder 112 can flow through conduits 270 and 274 to the reservoir 200. Consequently, as particles of plastic material are fed to the screw 22 from the hopper 30, a plastic semi-fluid mass of this material is fed by the screw 22 into the communicating passages 42 and 64. As the passages 42 and 64 become filled, the material therein exerts a back pressure on the screw 22 urging it rearwardly in the barrel 20, opening LS1a and closing LS1b, and forcing the piston 114 rearwardly in the cylinder 112 to thus force fluid out of the cylinder 112 through the lines 270 and 274 to the reservoir 200. This fluid must pass through the pressure regulating valve 276 which is set to maintain a predetermined fluid force on the piston 114 resisting rearward movement of the screw 22.

Before the screw 22 has been moved rearwardly a distance sufficient to provide for actuation of LS8, switch 432 is opened and cycle start switch 434 is closed. Since at this time normally open contacts 14CR2 are closed, closing of cycle start switch 434 causes energizing of relay 4CR, resulting in closing of normally open contacts 4CR1 which are connected in parallel with cycle start switch 434 which can then be released. Energizing of control relay 4CR also results in closing of normally open contacts 4CR2, 4CR3 and 4CR4.

Since solenoid #1 was de-energized as soon as switch 432 was released to de-energize 3CR, valve body 268 is in a position admitting fluid under pressure to the cylinder assembly 102 to thereby move the screw 22 forwardly. During forward movement of the screw 22, plastic from passages 42 and 64 is forced through discharge nozzle 44 to form a parison which depends from the die head 40 and is positioned between the spaced apart mold sections 140. As soon as the screw 22 has completed its forward movement to form the parison, plate 120 actuates LS1 to close contacts LS1a and open contacts LS1b. Assume that mold sequence switch 433 is closed. Closing of contacts LS1a causes energizing of 5CR to thereby open normally closed contacts 5CR1 and close normally open contacts 5CR2.

Figure 3:
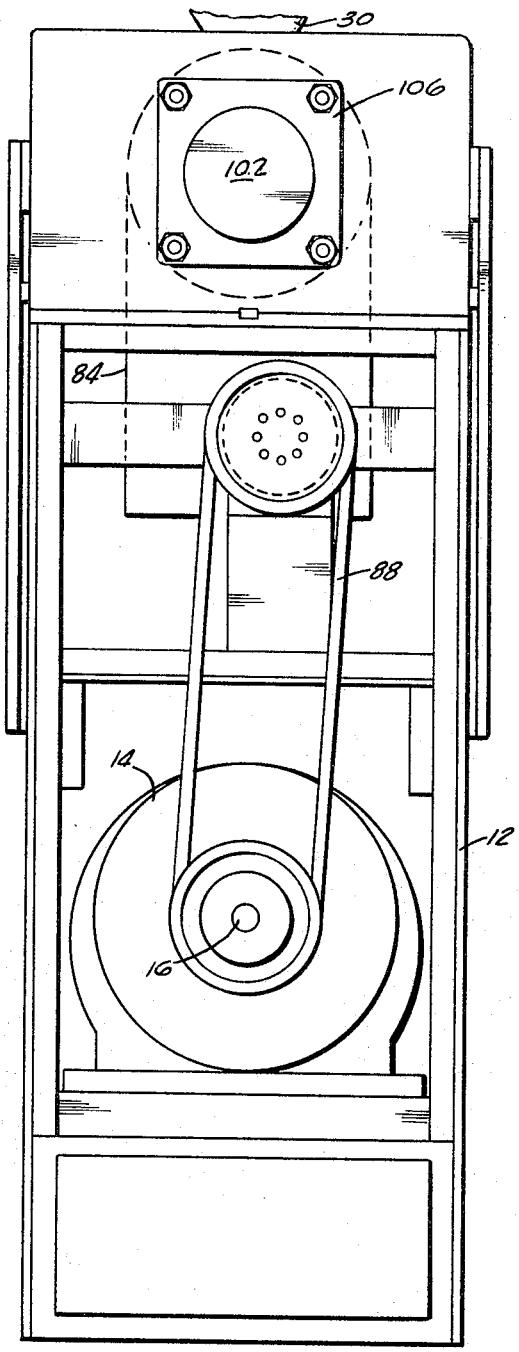
FIGURE 3 is an enlarged rear view of the machine shown in FIG. 1.

Closing of contacts 5CR2 causes energizing of relay 9CR through conductor 431 since at this time contacts 2TD1 are closed. Energizing of relay 9CR causes opening of normally closed contacts 9CR1 and 9CR3 and closing of normally open contacts 9CR2, 9CR4 and 9CR5. Closing of contacts 9CR4 and 9CR5 provides for energizing of solenoid #3 which, as shown in FIG. 3, results in movement of the hydraulic motor unit shaft 170 in a counterclockwise direction to move the mold sections 140 toward each other. During such movement, fluid from both of the pumps 192 and 194 is being supplied at low pressure to the hydraulic motor unit 172. When the molds start to close, switches LS4 and LS5 are released so that LS4 opens and LS5 closes, and switch LS7 is also released so that it closes.

Also in response to closing of contacts LS1a, time delay unit 1TD is energized, since the normally open contacts 4CR1 are now closed, and after a predetermined time delay normally open contacts 1TD1, which are series with 3CR close. This results in energizing 3CR, energizing of solenoid #1 and movement of valve body 268 to a position communicating the cylinder 102 with tank 200. Plastic pressure in passage 64 then causes screw 22 to move rearwardly. As soon as screw 22 starts its rearward movement, contact LS1a open to de-energize 5CR and 1TD. Mold closing relay 9CR remains energized at this time, however, since contacts 3CR2 are closed. Contacts 1TD1 open but relay 3CR remains energized since current flows through conductor 435 in which all four sets of contacts are closed. Under usual circumstances the screw 22 continues rearward movement until LS5 is again opened, which occurs when mold sections 140 have been moved apart. The time required to close and then open the molds is such that screw 22 does not move far enough rearwardly, under usual conditions to open LS8 before LS5 opens to de-energize relay 3CR and start the screw 22 moving again in a forward direction. In the event the operator elects to open manual sequence switch 433, 5CR is never energized. As a result, mold close relay 9CR is not energized until 1TD times out, closing contacts 1TD1, energizing 3CR and closing contacts 3CR2 in series with 9CR. As a result, if switch 433 is open, the molds do not close as soon as when the machine is cycled with switch 433 closed. This is advantageous when certain articles are to be formed at nozzle 44, since it allows the parison to hang from nozzle 44 a split second longer with some plastic continuing to be extruded because screw 22 is turning. This provides a thinner wall at the upper end of the parison and takes advantage of the natural tendency of the parison to "neck down."

In response to opening of the normally closed contacts 9CR3, which occurs when mold closed relay 9CR is energized to start the mold sections 140 toward each other, power to the terminals t for a low pressure safety timer 5TD is discontinued. This starts timer 5TD timing out, and at the end of a predetermined time out period, the normally closed contacts 5TD1 therefor will be opened unless power is restored to the terminals t. In the event the terminals 5TD1 open, 14CR is de-energized to open contacts 14CR1 and de-energize motor relay 2M so that the extruder motor 14 stops, and the machine cycle is interrupted. A circuit is completed through contacts 14CR3 and 9CR2 to energize relay 10CR and provide for closing of normally open contacts 10CR1 and 10CR2 to energize solenoid #4. When solenoid #4 is energized, hydraulic motor unit 172 is operated to move the mold sections 140 apart. When 10CR was energized, normally closed contacts 10CR3, in series with 3CR, are opened, and normally closed contacts 10CR4 in series with 9CR are opened.

The machine 10 then remains in an idle position, with the molds open and a circuit completed through normally closed contacts 14CR4 through a warning light R and a warning bell WB which signals some obstruction in the molds which has prevented them from moving to tightly closed positions within the period for which the timer TD5 is set. Such an obstruction occurs when a blown plastic article is not removed from a position between the mold sections 140 or when an improperly formed parison is formed at the die head 40 so as to prevent the mold sections 140 from closing tightly. In either of these cases, the formation of waste material is prevented by shutting down the machine 10 and opening the molds until the die heads 140 are cleared. The pressure developed by the hydraulic pump unit 179 is insufficient to move the mold sections 140 into engagement if any such obstruction is encountered since oil is free to flow through the relief valve 226 to the tank 200, and the 50 to 200 p.s.i. range for the valve 226 is selected because in this pressure range the motor unit 172 will sense a plastic obstruction between the mold sections 140.

In the event no obstruction is encountered, which is the usual case, the mold sections 140 are moved by the toggle mechanism 154 to positions in which they touch or practically touch, at which time the arm 176 on motor unit shaft 170 engages limit switch LS2 and closes it prior to the time TD5 times out. During normal operation of the machine 10, LS2 is closed before TD5 times out.

On closing of LS2, control relay 7CR is energized to close normally open contacts 7CR1 and restore power to the terminals $t$ for timer 5TD and prevent the timer from timing out. Energizing of relay 7CR also causes closing of normally open contacts 7CR2 and 7CR3 to cause energizing of solenoid #2. On energizing of solenoid #2, valve body 222 (FIG. 15) is shifted to the right to close pilot passage 220. In response to closing of passage 220, the flow of fluid through regulating valve 214 to tank 200 is stopped and the pressure developed in conduit 202 is increased sufficiently to open valve 208, by virtue of the pressure developed in pilot passage 218. The check valve 206 closes and the fluid from the pump 206 is then directed to tank 200.

The pump 192 then develops a high pressure in the conduit 202, since the pressure is limited only by the setting of valves 214, and this high pressure fluid is transmitted to the hydraulic motor unit 172 so as to move the toggle assembly to a substantially horizontal position in which the mold sections 140 are in "mold locked" position in which they are squeezed tightly against each other with such force that the tie rods 150 may actually be stretched. Excess hydraulic fluid flows through relief valve 214 to tank. Furthermore, this high pressure is transmitted through the conduit 254 to the accumulator 258 so as to compress the gas therein to later provide for a quick high pressure discharge of fluid from the accumulator 258 to in turn provide for a rapid forward movement of the screw 22.

In the "mold locked" position of the mold sections 140, the arm 176 on shaft 170 closes LS3 thereby energizing the relays for time delay units 2TD, 3TD and 4TD. Time delay relay 2TD has a set of normally closed contacts 2TD1, which open after a predetermined time delay following energization of 2TD, and normally open contacts 2TD2 which close following the expiration of the same time delay period. As soon as contacts 2TD1 open, 9CR is de-energized closing normally closed contacts 9CR2 which are in series with 10CR. Since LS7 is at this time closed, closing of contacts 2TD2 results in energizing 10CR. As soon as 9CR is de-energized, contacts 9CR4 and 9CR5 open to de-energize solenoid #3, and as soon as 10CR is energized to close contacts 10CR1 and 10CR2, solenoid #4 is energized, to thereby provide for shifting of valve bodies 236 and 240 (FIG. 15) to positions in which the hydraulic motor unit 172 rotates shaft 170 in a clockwise direction to move the toggle mechanism so as to move the mold sections 140 apart. At this time, therefore, the molds commence opening. Time delay unit 2TD is set to provide sufficient time to blow a parison depending from discharge nozzle 44 into conformity with the mold cavity formed by the mold sections 140 and allow some cooling of the blown parison between the time the mold is locked, is signalled by closing of LS3, and the time the molds commence opening in response to energizing of 10CR.

When 3TD times out, which takes place very quickly, normally open contacts 3TD1 are closed to energize 8CR and close normally open contacts 8CR1 and 8CR2 to provide for energizing solenoid #5. Energizing of solenoid #5 provides for shifting of valve body 344 to a position to provide for a supply of air to actuator 334 to shift valve body 326 to a position in which air is supplied from conduit 322 to passage 50 which communicates with the interior of the parison. At this time, therefore, the parison is blown into conformity with the mold cavity. As soon as time delay unit 4TD times out, normally closed contacts 4TD1 open to de-energize 8CR, open contacts 8CR1 and 8CR2 and de-energize solenoid #5 so as to move valve body 326 to a position in which the supply of blowing air in conduit 322 is blocked, and the interior of the blown plastic article 328 is connected to exhaust passage 330.

At this time mold sections 140 commence moving apart so that LS2 and LS3 open to de-energize 7CR, 2TD, 3TD and 4TD.

When the mold sections 140 have been moved apart a distance less than a full open position, rod 180 actuates LS4 and moves it to a closed position. In response to closing of LS4 (FIG. 13) 12CR is energized because contacts 11CR1 and 13CR1, in series therewith, are at this time closed. Contacts 11CR1 were closed when 11CR was energized, which took place in response to energizing of 10CR to close normally open contacts 10CR1 and 10CR2. Energizing of 11CR causes opening of contacts 11CR2 in series with 9CR and closing of locking contacts 11CR3. Locking contacts 10CR2 maintain 10CR energized after 2TD2 contacts have opened. Energizing of 12CR causes closing of normally open contacts 12CR1 and 12CR2 causing energizing of solenoid #7 which shifts valve body 358 to a position in which piston 362 is moved downwardly to move the stripper actuating rod 364 downwardly. This movement of piston rod 364 causes LS6b contacts to open and causes LS6a contacts to close, thereby energizing 13CR and causing closing of normally open contacts 13CR2 to maintain 13CR energized, since at this time switch LS1b is closed. Energizing of 13CR causes contacts 13CR5 to open so that 11CR will be de-energized when 10CR is de-energized. Contacts 13CR1 are opened to de-energize 12CR, open contacts 12CR1 and 12CR2 and de-energize solenoid #7 to return valve body 358 to its position shown in FIG. 1 and move piston rod 364 upwardly to again open contacts LS6a, and close contacts LS6b. Relay 13CR remains energized during this time since it is sealed through LS1b, so that contacts 13CR3 remain closed, as do contacts 13CR4 and 13CR5. Contacts LS6b and 9CR6 are connected in parallel for safety purposes so that in the event relay 9CR is energized to close the molds while LS6b is not held closed, 14CR will be de-energized to open contacts 14CR1 and de-energize the relay 2M for the extruder motor 14.

When the mold carrying platens 142 and 144 are still being moved apart, but have been moved to positions in which mold sections 140 are substantially a maximum distance apart, rod 182 actuates LS5 to open it. As shown in FIG. 12, LS5 is in series with 3CR, so that opening of LS5 at this time provides for de-energizing of 3CR, so that screw 22 starts moving forwardly at this time.

When the mold sections 140 have been moved their full distance apart, arm 178 engages LS7 and opens it de-energizing 10CR to open contacts 10CR1 and 10CR2 to de-energize solenoid #4, thereby providing for shifting of valve body 240 to a neutral position to terminate rotation of shaft 170 for hydraulic motor unit 172. The above described cycle is then repeated automatically until the machine 10 is shut down by opening a switch such as switch 414.

In the circuit 400, signal lights B indicate the direction of movement of the extruder secrew 22, and PS1 indicates a switch which is responsive to the pressure of plastic in passage 64. In the event this plastic pressure exceeds a predetermined safe pressure, PS1 opens to de-energize 14CR. Likewise, overfill limit switch LS8 is connected in series with 14CR for de-energizing 14CR in the event screw 22 is moved rearwardly a distance sufficient to provide for actuation of LS8 by actuator 184.

To summarize the operation of the machine 10, first assume that the motor 14 is operating to rotate the drive member 78 which is in turn driving the quill 70 through the ball spline assembly 101 which includes the balls 94.

Further assume that the screw 22 is in its retracted position shown in solid lines in FIG. 6 and that sufficient plastic material has been fed through the hopper 30 to the screw 22 to fill the passages 42 and 64 with a heated thermo-plastic material which is in a semi-fluid condition. The hydraulic cylinder assembly 102 has its piston rod 116 in its retracted position shown in FIG. 5. Fluid is then supplied to the cylinder assembly 102 through the lines 266 and 270 so as to extend the piston rod 116 out of the cylinder 112 and move the thrust members 118 and 124 from the positions shown in FIG. 5 toward the positions shown in FIG. 4. During such movement, the quill 70, which constitutes an integral rearward extension of the screw 22 rides on the balls 94 concurrently with operation of the balls to transmit rotary movement of the drive sleeve 78 to the quill 70. This movement of the quill 70 moves the screw 22 from its retracted position (FIG. 6) toward its extended position (FIG. 1) and during such movement heated semi-fluid plastic is forced from the passage 64 through the die head passage 42 and out the die head discharge orifice 44 in the form of an annular parison.

During the aforementioned forward movement of the screw 22, the pressure of the fluid supplied to cylinder 112 to actuate the screw 22 is controlled by regulating valve 278, so that the screw moves forward at a controlled rate. The cam 282 moves follower 280 so as to adjust the position of valve 278 so as to obtain a variable parison wall thickness which is predetermined to provide a desired parison thickness.

When the screw has substantially completed its forward movement, so that it is in substantially the position shown in FIG. 1, LS1 is engaged so as to shift valve body 268 to a position in which the supply of pressure fluid to the line 270 for the hydraulic cylinder assembly 102 is discontinued. Line 270 is now connected to tank conduit 274, so that the piston 114 is free to move rearwardly in the cylinder 112, with the rate of movement of the piston 114 being restricted only by the effect of the pressure regulating valve 276 in the line 274. The function of the valve 276 is to at all times maintain hydraulic back pressure, of predetermined magnitude, on the piston 114. The pressure regulating valve 276 is adjusted for the size of the discharge orifice 44 and the kind of material being extruded therethrough. This adjustment provides for sufficient back pressure on the piston 114 to insure that the retracting movement of the screw 22 from its forward position shown in FIG. 1 to its rearward position in FIG. 6 will not be faster than the capacity of the screw 22 to completely fill up the space in the passage 64 which it is vacating. Consequently, the rate of rotation and the lead of the thread 24 on the screw 22 also have some effect on the adjustment of the pressure regulating valve 276. The adjustment of valve 276 is also such that the back pressure on the piston 114 is not of sufficient magnitude to cause a leakage of plastic through the discharge orifice 44 during retraction of the screw 22.

As a result, once the supply of fluid to the line 270 is terminated, the action of the screw 22 to continuously supply worked and heated plastic to the passage 64 insures a sufficient back pressure on the screw end portion 26 to move the screw 22 rearwardly in the barrel 20. This rearward movement in response to the pressure build-up in the passage 64, without leakage of plastic through the discharge orifice 44, is made possible by the low friction driving support of the screw 22 on the balls 94. If it was necessary, in order to continuously rotate the screw 22, to provide a high friction connection requiring large forces to reciprocate the screw 22, a shutoff valve would have to be interposed in the passage 64 or the passage 42. As pointed out previously, the presence of such a shutoff valve would necessarily restrict the use of the machine 10 to only certain materials and would also add to the cost and complexity of the machine.

The mold actuating mechanism 154 is operated to close the open mold sections 140 either just before or at the time the screw 22 commences its rearward movement depending on the position of selector switch 433. The molds close on the parison extruded through orifice 44, the parison is blown and the molds commence opening. During opening the blown plastic article is stripped from orifice 44 in response to downward movement of piston rod 364. Just before the molds have been fully opened LS5 is actuated to de-energize CR3 and start the screw 22 moving forwardly again through another cycle. By virtue of the relatively close proximity of the forward end portion 26 of the screw 22 to the discharge orifice 44, the pressure drop in the plastic between the screw 22 and the orifice 44 is reduced to a minimum. Consequently, a faster rate of discharge of material through the orifice 44 is obtainable in the machine 10. This is advantageous, not only for its direct effect on cycle time of the machine but also for its indirect effect. The time required for extrusion of a parison determines the time period during which the mold sections, indicated at 140 in FIG. 1 must be spaced apart. Since cooling fluid is circulated through the mold sections 140, there is the danger of condensation of water on the mold sections 122 during the time they are in spaced positions. The lower the temperature to which the mold is cooled and the longer the mold is open to ambient atmosphere the greater the danger of condensation. Consequently, if the mold is open for a prolonged period, care must be taken not to cool the mold sections 140 below a certain temperature or the undesirable effects of condensation are incurred. As a result, the mold 140 cannot be used as effectively as possible to cool the blown parison which also reduces cycle time. In the machine of this invention, wherein a faster parison extrusion is obtained, the mold sections 140 may also be cooled to a lower temperature since the time periods during which they are open is reduced.

It will be understood that the blow molding machine with continuously rotating reciprocating extruder screw which is herein disclosed and described is presented for purposes of explanation and illustration and is not intended to indicate limits of the invention, the scope of which is defined by the following claims.

What is claimed is:

1. A blow molding machine comprising a main frame, an extruder on said main frame consisting of a barrel and a screw in said barrel, drive means on said main frame for continuously rotating said screw, low friction means supporting said screw on said main frame for reciprocating movement relative to said barrel, a die head connected to one end of said barrel and provided with an annular discharge orifice, means providing continuous uninterrupted communication between said discharge orifice and said one end of said barrel, means for supplying an extrudable material to said barrel adjacent the opposite end thereof, a fluid actuated cylinder assembly mounted on said main frame and connected to said screw for applying an axial force thereto of a magnitude sufficient to push said material from said one end of said barrel through said discharge orifice, means providing for a subsequent reduction in the magnitude of said force to a magnitude less than the oppositely directed force on said screw of material disposed between said orifice and said supply means, said drive means including an axial extension of said screw, a drive sleeve concentrically arranged about said screw extension and rotatably supported on said main frame, substantially radially aligned grooves in said screw extension and said drive sleeve, and a plurality of balls in said aligned grooves supporting said screw extension on said drive sleeve for axial movement relative thereto and for transmitting rotatable driving movement of said sleeve to said screw extension.

2. In a blow molding machine having a main frame, means on said frame forming a continuous uninterrupted passage for plastic in a semi-fluid condition, a screw extending into one end of said passage and adapted to have plastic fed to it for conversion into said semi-fluid condition, said passage having a discharge orifice at the opposite end, an axial extension on said screw, a sleeve on said main frame arranged in a concentric spaced relation about said extension, substantially radially aligned grooves in said screw extension and said sleeve disposed parallel to the axes thereof, ball members arranged in said grooves so as to support said extension on said sleeve for reciprocable movement relative thereto, a hydraulic cylinder assembly having a cylinder mounted on said frame and a piston rod reciprocable in a direction parallel to said screw, means connecting said piston rod to said screw extension so that on movement of said piston rod in one direction said screw is moved in a direction to force plastic out of said passage through said orifice, means for supplying fluid to said cylinder to provide a pressure of sufficient magnitude therein to move said piston rod in said one direction, means for discontinuing the supply of fluid to said cylinder and providing for an exhaust of fluid therefrom on movement of said screw in an opposite direction in response to the force thereon of plastic in said passage, and means restricting the exhaust of fluid from said cylinder to maintain a predetermined force on said screw resisting movement thereof in said opposite direction sufficiently to restrict the rate of movement of said screw in said opposite direction to a rate at which said screw can deliver plastic in a semi-fluid condition to said passage fast enough to maintain said passage in a filled condition.

3. In a blow molding machine having a main frame, an extruder on said main frame which includes a hollow barrel having a front end and a rear end and a screw in said barrel, a die head having an orifice which is in continuous uninterrupted communication with said barrel front end, means for moving said screw forwardly in said barrel, drive means for continuously rotating said screw, said drive means including an axial rearward extension of said screw, a drive sleeve concentrically arranged about said screw extension and rotatably supported on said main frame, substantially radially aligned grooves in said screw extension and said drive sleeve, and a plurality of balls in said aligned grooves supporting said screw extension on said drive sleeve for axial movement relative thereto and for transmitting rotatable driving movement of said sleeve to said screw extension.

4. In a blow molding machine having a main frame, means on said frame forming a continuous uninterrupted passage for plastic in a sem-fluid condition, a screw extending into one end of said passage and adapted to have plastic fed to it for conversion into said semi-fluid condition, said passage having a discharge orifice at the opposite end, an axial extension on said screw, a sleeve on said main frame arranged in a concentric spaced relation about said extension, substantially radially aligned grooves in said screw extension and said sleeve disposed parallel to the axes thereof, ball members arranged in said grooves so as to support said extension on said sleeve for reciprocable movement relative thereto, a hydraulic cylinder assembly having a cylinder mounted on said frame and a piston rod reciprocable in a direction parallel to said screw, means connecting said piston rod to said screw extension so that on movement of said piston rod in one direction, said screw is moved in a direction to force plastic out of said passage through said orifice, means for supplying fluid to said cylinder to provide a pressure of sufficient magnitude therein to move said piston rod in said one direction, means responsive to movement of said screw in said direction to a predetermined position for discontinuing the supply of fluid to said cylinder and providing for an exhaust of fluid therefrom on movement of said screw in an opposite direction in response to the force thereon of plastic in said passage, means restricting the exhaust of fluid from said cylinder to maintain a predetermined force on said screw resisting movement thereof in said opposite direction sufficient to restrict the rate of movement of said screw in said opposite direction to a rate at which said screw can deliver plastic in a semi-fluid condition to said passage fast enough to maintain said passage in a filled condition, a plurality of mold sections movable from opposite directions into engaged positions surrounding plastic forced out of said orifice, means for moving said mold sections from said engaged positions to spaced positions, and means responsive to movement of said mold sections to said spaced positions actuating said fluid supply means to move said piston rod in said one direction.

5. In a blow molding machine having a main frame, means on said frame forming a continuous uninterrupted passage for plastic in a semi-fluid condition, a screw extending into one end of said passage and adapted to have plastic fed to it for conversion into said semi-fluid condition, said passage having a discharge orifice at the opposite end, an axial extension on said screw, a sleeve on said main frame arranged in a concentric spaced relation about said extension, substantially radially aligned grooves in said screw extension and said sleeve disposed parallel to the axes thereof, ball members arranged in said grooves so as to support said extension on said sleeve for reciprocable movement relative thereto, drive means on said main frame continuously rotating said sleeve so as to continuously rotate said screw, a hydraulic cylinder assembly having a cylinder mounted on said frame and a piston rod reciprocable in a direction parallel to said screw, means connecting said piston rod to said screw extension so that on movement of said piston rod in one direction said screw is moved in a direction to force plastic out of said passage through said orifice, means for supplying fluid to said cylinder to provide a pressure of sufficient magnitude therein to move said piston rod in said one direction, means for discontinuing the supply of fluid to said cylinder and providing for an exhaust of fluid therefrom on movement of said screw in an opposite direction in response to the force thereon of plastic in said passage, and means restricting the exhaust of fluid from said cylinder to maintain a predetermined force on said screw resisting movement thereof in said opposite direction sufficiently to restrict the rate of movement of said screw in said opposite direction to a rate at which said screw can deliver plastic in a semi-fluid condition to said passage fast enough to maintain said passage in a filled condition.

6. In a blow molding machine according to claim 5 variable fluid pressure control means disposed in said fluid supply means to said cylinder, and coacting cam and cam follower means on said screw extension and said fluid pressure control means for varying the pressure of fluid in said cylinder during movement of said screw in a direction to force plastic out said orifice.

7. A blow molding machine comprising a main frame, means on said frame forming a continuous uninterrupted passage for plastic in a semi-fluid condition, a screw extending into one end of said passage and adapted to have plastic fed to it for conversion into said semi-fluid condition, said passage having a discharge orifice at the opposite end, a low friction means on said main frame supporting said screw for reciprocable movement relative to said barrel, means including said low friction means for continuously rotating said screw during reciprocal movement thereof, a hydraulic cylinder assembly having a cylinder mounted on said frame and a piston rod reciprocable in a direction parallel to said screw, means connecting said piston rod to said screw so that on movement of said piston rod in one direction said screw is moved in a direction to force plastic out of said passage through said orifice, means for supplying fluid to said cylinder to provide a pressure of sufficient magnitude therein to move said piston rod in said one direction, means for discontinuing the supply of fluid to said cylinder and providing for an exhaust of fluid therefrom on movement of said screw in an opposite direction in response to the force thereon of plastic in said passage, and means restricting the exhaust of fluid from said cylinder to maintain a predetermined force on said screw resisting movement thereof in said opposite direction sufficiently to restrict the rate of movement of said screw in said opposite direction to a rate at which said screw can deliver plastic in a semi-fluid condition to said passage fast enough to maintain said passage in a filled condition, mold forming means movably mounted on said main frame for movement between "mold open" and "mold closed" positions, a mold actuating mechanism for moving said mold forming means between open and closed position, means responsive to movement of said actuating mechanism to a position corresponding substantially to mold open position of said mold for actuating said fluid supplying means to supply fluid to said cylinder, and means responsive to movement of said screw in a direction to force plastic out said orifice to a predetermined position for discontinuing the supply of fluid to said cylinder.

8. A blow molding machine according to claim 7 in which said last mentioned means includes a time delay switch.

9. A blow molding machine according to claim 8 in which means are provided for moving said mold actuating mechanism to move said mold forming means toward "mold closed" position prior to timing out of said time delay switch.

10. A blow molding machine according to claim 7 including control means responsive to movement of said screw to said predetermined position for moving said mold actuating mechanism to move said mold forming means toward "mold closed" position.

11. In a blow molding machine having a main frame, means on said frame forming a passage for plastic in a semi-fluid condition, a screw extending into one end of said passage and adapted to have plastic fed to it for conversion into said semi-fluid condition, said passage having a discharge orifice at the opposite end, a hydraulic cylinder assembly having a cylinder mounted on said frame and a piston rod reciprocable in a direction parallel to said screw, means connecting said piston rod to said screw so that on movement of said piston rod in one direction said screw is moved in a direction to force plastic out of said passage through said orifice, means for supplying fluid to said cylinder to provide a pressure of sufficient magnitude therein to move said piston rod in said one direction, means responsive to movement of said screw in said direction to a predetermined position for discontinuing the supply of fluid to said cylinder and providing for an exhaust of fluid therefrom on movement of said screw in an opposite direction in response to the force thereon of plastic in said passage, means restricting the exhaust of fluid from said cylinder to maintain a predetermined force on said screw resisting movement thereof in said opposite direction sufficient to restrict the rate of movement of said screw in said opposite direction to a rate at which said screw can deliver plastic in a semi-fluid condition to said passage fast enough to maintain said passage in a filled condition, a plurality of mold sections movable from opposite directions into engaged positions surrounding plastic forced out of said orifice, means for moving said mold sections from said engaged positions to spaced positions, and means responsive to movement of said mold sections to said spaced positions for actuating said fluid supply means to move said piston rod in said one direction.

12. In a blow molding machine, the combination of a barrel having a passage extending longitudinally therein, a die head connected to one end of said barrel and provided with an annular discharge orifice, a reciprocable and continuously rotatable screw within said passage for plasticizing and for feeding plastic material in a forward direction toward said discharge orifice, a separable mold adjacent to said discharge orifice for receiving plastic material discharged through said annular discharge orifice, means to open and close said mold, means for supplying extrudable material to said barrel adjacent to the opposite end thereof, thrust means connected to said screw for applying an axial force thereto of a magnitude sufficient to push plasticized material from between said screw and said one end of said barrel in a forward direction through said annular discharge orifice, means for maintaining said force at a magnitude less than the oppositely directed force exerted on the rotating screw by the material disposed between said orifice and said supply means so that said screw will be moved by said oppositely directed force axially away from said annular discharge orifice, first control means operated when the screw has traveled in a forward direction to a fixed location, means responsive to operation of said first control means for discontinuing operation of said thrust means, and second control means operated when said mold is opened, said thrust means being responsive to operation of said second control means for positively applying said axial force for thrusting the screw in a direction toward said discharge orifice.

13. A blow molding machine comprising a barrel having a passage extending longitudinally therein, a die head connected to one end of said barrel and having a discharge orifice, a reciprocable and continuously rotatable screw within said passage for plasticizing and for feeding plastic material in a forward direction toward said discharge orifice, a separable mold adjacent to said discharge orifice for receiving plastic material discharged through said orifice, means to open and close said mold, means for supplying extrudable material to said barrel adjacent to the opposite end thereof, means for yieldingly allowing reciprocation of said screw in a rearward direction so that plasticized material can be accumulated forward of said screw as the latter continues to rotate and yieldingly reciprocates in a rearward direction, means responsive to the time of opening of said molds for positively thrusting said screw in a forward direction to discharge through said orifice plasticized material which has been accumulated forward of said screw, the last-named means being responsive to travel of said screw to a fixed location to interrupt said thrusting action so that a new charge of plasticized material can be accumulated forward of said screw as the latter continues to rotate and again yieldingly reciprocates in a rearward direction, and control means for selectively varying the rate at which said screw yieldingly reciprocates in a rearward direction for selectively varying the volume of a charge accumulated forward of said screw.

References Cited

UNITED STATES PATENTS

| | | |
|---|---|---|
| 2,734,226 | 2/1956 | Willert. |
| 3,044,112 | 7/1962 | Perry _____ 18—5 |
| 3,163,693 | 12/1964 | Stenger _____ 18—30 X |
| 3,241,185 | 3/1966 | Hufford _____ 18—5 X |
| 3,256,563 | 6/1966 | Criss et al. _____ 18—30 X |

J. SPENCER OVERHOLSER, *Primary Examiner.*

WILBUR L. McBAY, *Examiner.*